(12) United States Patent
Moravec et al.

(10) Patent No.: US 9,718,556 B2
(45) Date of Patent: Aug. 1, 2017

(54) COOLING SYSTEM FOR A CENTER WING TANK OF AN AIRCRAFT

(71) Applicant: The Boeing Company, Chicago, IL (US)

(72) Inventors: Bradford A. Moravec, Kirkland, WA (US); Rodney N. Graham, Issaquah, WA (US); Alan Grim, Lake Stevens, WA (US); Patrick J. Mulvaney, Everett, WA (US); David A. Adkins, II, Seattle, WA (US); Eric C. Olson, Seattle, WA (US); Ivana Jojic, Bellevue, WA (US); Mark M. Thornton, Seattle, WA (US); Jean-Philippe A. Beliéres, Redmond, WA (US)

(73) Assignee: The Boeing Company, Chicago, IL (US)

( * ) Notice: Subject to any disclaimer, the term of this patent is extended or adjusted under 35 U.S.C. 154(b) by 351 days.

(21) Appl. No.: 14/557,959

(22) Filed: Dec. 2, 2014

(65) Prior Publication Data

US 2016/0152343 A1 Jun. 2, 2016

(51) Int. Cl.
*G05D 23/00* (2006.01)
*B64D 37/34* (2006.01)
*B64D 37/04* (2006.01)
*B64D 37/32* (2006.01)

(52) U.S. Cl.
CPC ............. *B64D 37/34* (2013.01); *B64D 37/04* (2013.01); *B64D 37/32* (2013.01)

(58) Field of Classification Search
CPC ........ B64D 37/34; B64D 37/04; B64D 37/32; F24F 11/0012; F24F 2011/0045; F24F 2011/0073; B60H 1/00; B61D 27/00; Y10S 388/921
USPC .................................. 165/287, 41, 200, 202
See application file for complete search history.

(56) References Cited

U.S. PATENT DOCUMENTS

| | | | | |
|---|---|---|---|---|
| 3,556,199 A | * | 1/1971 | De Groote | F15B 21/042 126/378.1 |
| 4,505,124 A | * | 3/1985 | Mayer | B64D 37/34 123/553 |
| 5,738,304 A | * | 4/1998 | Tavano | B64D 37/32 137/67 |

(Continued)

FOREIGN PATENT DOCUMENTS

| EP | 2592000 | 5/2013 |
|---|---|---|
| EP | 2594487 | 5/2013 |

*Primary Examiner* — Justin Jonaitis
(74) *Attorney, Agent, or Firm* — Thompson Hine LLP

(57) ABSTRACT

A cooling system for a fuel tank of an aircraft includes a temperature sensor, a cooling system, and a control module. The temperature sensor detects a fuel temperature within the fuel tank. The cooling system maintains the fuel temperature below a control temperature. The phase change cooling system includes a heat exchanger. A cooling fluid flows through the heat exchanger and is in thermal communication with a surface of the fuel tank. The control module is in signal communication with the temperature sensor and the cooling system. The control module includes control logic for monitoring the temperature sensor, determining if the fuel temperature is above the control temperature, and generating an activation signal.

17 Claims, 3 Drawing Sheets

(56) References Cited

U.S. PATENT DOCUMENTS

| | | | |
|---|---|---|---|
| 7,152,635 B2* | 12/2006 | Moravec | B64D 37/32 |
| | | | 141/64 |
| 2005/0224654 A1 | 10/2005 | Loss et al. | |
| 2010/0108811 A1* | 5/2010 | Gupta | B64D 37/32 |
| | | | 244/129.2 |
| 2014/0208943 A1 | 7/2014 | Gupta | |
| 2015/0151845 A1* | 6/2015 | Jones | B64D 37/32 |
| | | | 244/135 R |
| 2015/0251766 A1* | 9/2015 | Atkey | B64D 13/08 |
| | | | 244/13 |

* cited by examiner

COOLING SYSTEM FOR A CENTER WING TANK OF AN AIRCRAFT

FIELD

The disclosed system relates to a system for controlling the fuel temperature of an aircraft and, more particularly, to a cooling system for maintaining the temperature of fuel located within a fuel tank of an aircraft below a control temperature and above a lower limit temperature.

BACKGROUND

Fuel tanks may be located within the outboard portion of wings of an aircraft, and are referred to as wing tanks. Some types of aircraft may include multiple main tanks and a reserve tank located within each wing. The aircraft may also include a center wing tank located within a fuselage of the aircraft. The center wing tank may also include an inboard portion of the wings on some aircraft. The center wing tank may also be located proximate to a heat source. One example of a heat source proximate to the center wing tank is an air conditioning (AC) pack, which is part of an environmental control system (ECS) of the aircraft. Although the aircraft consumes liquid fuel, the fuel tanks within the aircraft all contain some amount of air and fuel vapor above the upper surface of the fuel, which is commonly referred to as ullage. During relatively long flights a large quantity of fuel may be consumed, which in turn increases the ullage volume in the fuel tanks of the aircraft. The ullage may contain reactive components such as oxygen and fuel vapors. Additionally, the ullage may also contain other gases or vapors from the atmosphere, or that are generated by the aircraft and routed into the fuel tanks.

The center wing tank's proximity to heat sources, such as the AC packs, may increase the temperature of the fuel as well as the reactive components contained within the center wing tank of the aircraft. Some types of aircraft currently available may include an inerting system that provides an inerting gas to the center wing tank as well as the other fuel tanks within the aircraft, thereby altering the ullage gas composition. However, there exists a continuing need in the art for other types of simple, cost-effective approaches for managing the reactive components within the ullage of an aircraft.

SUMMARY

In one aspect, a cooling system for a fuel tank of an aircraft includes a temperature sensor, a cooling system, and a control module. The temperature sensor detects a fuel temperature within the fuel tank. The cooling system maintains the fuel temperature below a control temperature. The cooling system includes a heat exchanger. A cooling fluid flows through the heat exchanger and is in thermal communication with a surface of the fuel tank. The control module is in signal communication with the temperature sensor and the cooling system. The control module includes control logic for monitoring the temperature sensor, determining if the fuel temperature is above the control temperature, and generating an activation signal to activate the cooling system if the fuel temperature is above the control temperature.

In another aspect, a method of cooling a center wing tank of an aircraft is disclosed. The method includes detecting a fuel temperature within the center wing tank by a temperature sensor. The method also includes monitoring the temperature sensor by a control module. The control module is in signal communication with the temperature sensor. The method further includes determining if the fuel temperature is above a control temperature by the control module. The method also includes generating an activation signal, by the control module, if the fuel temperature is above the control temperature. The method includes activating a cooling system if the activation signal is generated. Finally, the method includes flowing a cooling fluid through a heat exchanger if the cooling system is activated. The cooling fluid is in thermal communication with a surface of the center wing tank.

Other objects and advantages of the disclosed method and system will be apparent from the following description, the accompanying drawings and the appended claims.

DETAILED DESCRIPTION

Figure 1:
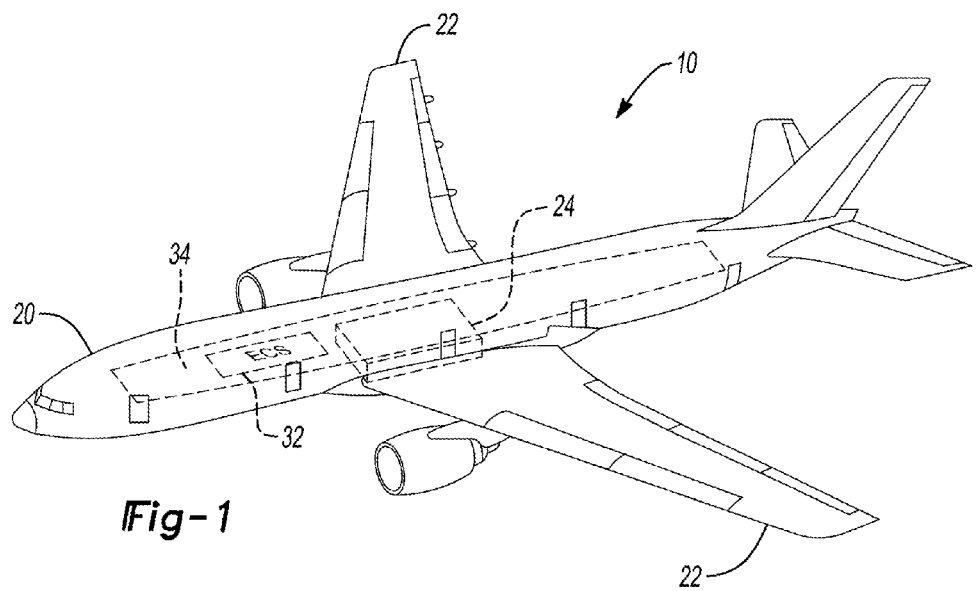
FIG. 1 is an illustration of an aircraft including a center wing tank.

As shown in FIG. 1, the disclosed aircraft 10 may include a fuselage 20 and wings 22. The aircraft 10 may also include a center wing tank 24 positioned at least partially in the fuselage 20 of the aircraft 10 and adjacent to both the wings 22. Referring to both FIGS. 1 and 2, the center wing tank 24 may be positioned proximate to one or more air conditioning (AC) packs 30 (shown in FIG. 2). Those skilled in the art will readily appreciate that the AC pack 30 is an apparatus responsible for conditioning air drawn from outside the aircraft 10 and supplied to a cabin 34. The AC pack 30 may be part of an environmental control system (ECS) 32 of the aircraft 10. The ECS 32 may be used to control various parameters in the cabin 34 located within the fuselage 20 of the aircraft 10 such as, for example, air temperature, pressure, and humidity.

Figure 2:
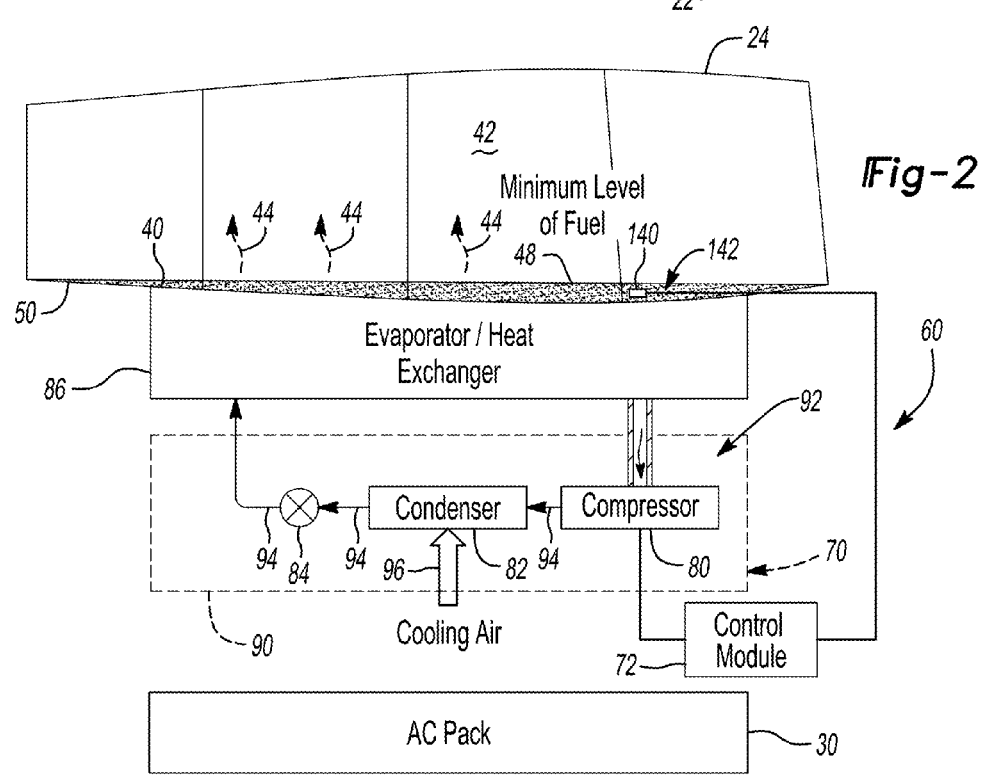
FIG. 2 is a schematic diagram of the center wing tank shown in FIG. 1, an air conditioning (AC) pack, and a center wing tank cooling system.

Turning now to FIG. 2, the center wing tank 24 may be used to contain or hold fuel 40 that is used for eventual consumption by the aircraft 10 (FIG. 1). The center wing tank 24 may also contain a volume of gases above the fuel surface, which is referred to as ullage 42. For example, in the embodiment as shown in FIG. 2, a majority of the fuel 40 contained within the center wing tank 24 has been consumed such that the fuel 40 is at a minimum level 48. Accordingly, the ullage 42 is at its maximum volume. The center wing tank 24 may be positioned proximate to the AC pack 30 such that the AC pack 30 acts as a heat source that raises the temperature of the fuel 40 contained within the center wing tank 24. Heated fuel 40 may produce fuel vapors 44 within the center wing tank 24, which are evaporated into the ullage 42. In particular, the fuel 40 may settle along a lowermost surface 50 of the center wing tank 24. The lowermost surface 50 of the center wing tank 24 may be positioned adjacent to one or more of the AC packs 30 such that the AC packs 30 may heat and thereby raise the temperature of the fuel 40 settled along the lowermost surface 50 of the center wing tank 24. Although an AC pack 30 is illustrated, it is to be understood that the center wing tank 24 may be exposed to other sources of heat within the aircraft 10 (FIG. 1) instead such as, for example, heat from the cabin 34 (FIG. 1), other fuel tanks located within the aircraft 10, or hydraulic heat exchangers.

In order to reduce the temperature of the fuel 40 located within the center wing tank 24, a center wing tank cooling system 60 may be positioned between the lowermost surface 50 of the center wing tank 24 and the AC pack 30. Those skilled in the art will readily appreciate that although a center wing tank 24 is described, the disclosed cooling system may be applied to other types of fuel tanks located within the aircraft 10 (FIG. 1) as well, and that the disclosure should not be limited to only cooling the center wing tank 24.

The center wing tank cooling system 60 may be used to maintain the temperature of the fuel 40 below a predetermined or control temperature, which is explained in greater detail below. The control temperature may be a predetermined amount below a lower flammability limit (LFL) temperature of the fuel 40. The control temperature may act as a margin or buffer to ensure that the fuel 40 is maintained below the LFL temperature. The LFL temperature may be a function of the flash point of the fuel 40 and fuel tank ullage pressure. In an embodiment where the center wing tank 24 is an open vented tank, the fuel tank ullage pressure is about atmospheric pressure at altitude. Thus, the control temperature is also based on the flash point of the fuel 40 and fuel tank ullage pressure. For example, if the LFL temperature of one commonly used fuel type is about 38° C. (100° F.) at a given pressure, then the control temperature may range from about 10° C. (80° F.) to about 32° C. (88° F.). However, it is to be understood that these ranges for the predetermined margin are merely exemplary in nature, and may be modified.

The center wing tank cooling system 60 may include a cooling unit 70 and a control module 72. In the exemplary embodiment as shown, the cooling unit 70 may include a compressor 80, a condenser 82, an expansion valve 84, and a heat exchanger 86. Those skilled in the art will appreciate that the compressor 80, the condenser 82, the expansion valve 84, and the heat exchanger 86 create a phase change cooling system 92. The phase change cooling system 92 utilizes a cooling fluid, such as refrigerant 94, that undergoes phase transitions from a liquid to a gas and back again to a liquid in order to provide cooling to the center wing tank 24.

It is to be understood that the center wing tank cooling system 60 should not be limited to only a phase change based cooling system where the refrigerant 94 undergoes phase transitions in order to provide cooling to the center wing tank 24. Instead, those skilled in the art will readily appreciate that the phase change cooling system 92 as illustrated in the figures is merely exemplary in nature and that any other type of cooling system may be used as well such as, for example, an air cycle cooling system or a liquid cooling system. For example, in one approach, bleed air extracted from one or more main engines of the aircraft 10 may be used to provide cooling to the center wing tank 24. Moreover, although refrigerant 94 is described, it is to be understood that any other type of cooling fluid may be used as well to draw heat from the center wing tank 24 depending on the specific type of cooling system. For example, the cooling fluid may be a liquid if the cooling system is a liquid cooling system, or a gas such as air if the cooling system is an air cycle cooling system.

The exemplary phase change cooling system 92 operates by compressing the refrigerant 94 in gaseous form by the compressor 80, dissipating heat from the gas through the condenser 82 to cause the gas to condense into a fluid, passing the fluid through the expansion valve 84, and allowing the fluid to flow through the heat exchanger 86. As seen in FIG. 2, cooling air 96 may flow over the condenser 82. The cooling air 96 may be used to draw heat from the gas flowing through the condenser 82. The cooling air 96 may be ram air drawn from outside the aircraft 10 (FIG. 1). Alternatively, in another embodiment, the cooling air 96 may be generated by one or more cooling fans (not illustrated in the figures).

The heat exchanger 86 may be any type of device that allows for cooling fluid to flow through and draw heat from the surrounding environment. For example, in the embodiment as shown in heat exchanger 86 is an evaporator that allows the refrigerant 94 to evaporate from liquid form back to gas form, while drawing heat. In the embodiment as shown in FIG. 2 the refrigerant 94, which is in gas form, is transported back to the compressor 80. The heat exchanger 86 may be located along the lowermost surface 50 of the center wing tank 24. The heat exchanger 86 may be used to provide cooling to the fuel 40 located within the center wing tank 24.

Figure 3:
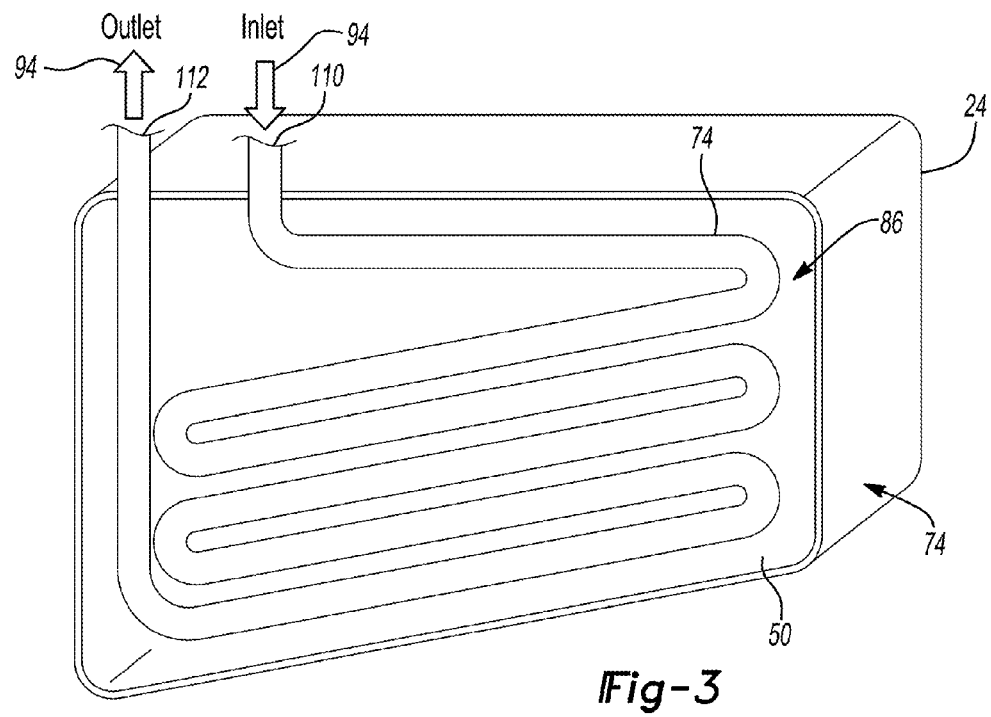
FIG. 3 is a view of a lowermost surface the center wing tank shown in FIG. 2.

Turning now to FIG. 3, the lowermost surface 50 of the center wing tank 24 and the heat exchanger 86 are illustrated. The heat exchanger 86 may include a cooling loop 74, an inlet 110 and an outlet 112. The refrigerant 94 exiting the expansion valve 84 (FIG. 2) enters the heat exchanger 86 through the inlet 110 of the cooling loop 74. As seen in FIG. 3, the cooling loop 74 is disposed along the lowermost surface 50 of the center wing tank 24. The refrigerant 94 flows through the cooling loop 74 in liquid form and draws heat from the lowermost surface 50 of the center wing tank 24, thereby providing cooling to the fuel 40 of the center wing tank 24 (FIG. 2). In other words, the refrigerant 94 is in thermal communication with the lowermost surface 50 of the center wing tank 24 and is used to lower and control the temperature of the fuel 40 (FIG. 2) contained within the center wing tank 24. As explained above, although refrigerant 94 is discussed, those skilled in the art will readily appreciate that any other type of cooling fluid may be used as well to draw heat from the lowermost surface 50 of the center wing tank 24.

Those skilled in the art will also appreciate that while the cooling loop 74 is disposed along the lowermost surface 50 of the center wing tank 24, the cooling loop 74 may be disposed along any other surface of the center wing tank 24 as well. However, placing the cooling loop 74 of the heat exchanger 86 along the lowermost surface 50 may provide the most effective cooling available, since the AC packs 30 (FIG. 1) radiate heat directly below the center wing tank 24.

In the exemplary embodiment as shown in FIG. 3, the cooling loop 74 of the heat exchanger 86 is arranged in a serpentine configuration along substantially the entire lowermost surface 50 of the center wing tank 24. However, it is to be understood that the cooling loop 74 may be arranged in other configurations along the lowermost surface 50 of the center wing tank 24 as well. For example, in another embodiment, the cooling loop 74 may be arranged in a coil configuration along the lowermost surface 50 of the center wing tank 24. Moreover, although FIG. 3 illustrates the cooling loop 74 covering substantially the entire lowermost surface 50 of the center wing tank 24, those skilled in the art will appreciate that the cooling loop 74 may only cover a portion of the lowermost surface 50 of the center wing tank 24 as well. Finally, in the embodiment as illustrated in the figures, the cooling loop 74 contacts the lowermost surface 50 of the center wing tank 24. However, it is to be understood that in an alternative embodiment, the cooling loop 74 may be embedded or contained within the lowermost surface 50 of the center wing tank 24 as well.

Turning back to FIG. 2, the control module 72 may be in signal communication with both the phase change cooling system 92 and a temperature sensor 140. Additionally, the control module 72 may also be in communication with aircraft signals, switches, or sensors that indicate aircraft altitude, pressure, or fuel quantity within the center wing tank 24. For example, the control module 72 may monitor aircraft altitude using a dedicated pressure sensor, or by communication with an existing airplane altitude signal. The temperature sensor 140 detects the temperature of the fuel 40 within the center wing tank 24. The temperature sensor 140 may be located along a lowermost portion 142 of the center wing tank 24. Specifically, it should be appreciated that the temperature sensor 140 may be positioned along the lowermost portion 142 within the center wing tank 24 in order to detect the temperature of the fuel 40 located closest to the AC packs 30. In other words, the temperature sensor 140 may be positioned within the center wing tank 24 (or another type of fuel tank, if applicable) in order to monitor the hottest portion of the fuel 40 located within the center wing tank 24. Those skilled in the art will readily appreciate that the temperature sensor 140 may be a pre-existing sensor that is already part of the center wing tank 24. In other words, the center wing tank cooling system 60 does not require a specialized sensor in order to determine fuel temperature, which in turn reduces the overall cost and complexity of the center wing tank cooling system 60.

The control module 72 may refer to, or be part of, an application specific integrated circuit (ASIC), an electronic circuit, a combinational logic circuit, a field programmable gate array (FPGA), a processor (shared, dedicated, or group) that executes code, or a combination of some or all of the above, such as in a system-on-chip. The control module 72 includes control logic for monitoring the temperature sensor 140. In addition to receiving the temperature of the fuel 40 from the temperature sensor 140, the control module 72 may also receive as input aircraft altitude.

The control module 72 also includes control logic for selectively activating the phase change cooling system 92 based on a fuel temperature and the aircraft altitude. Specifically, the control module 72 monitors the temperature sensor 140 to determine if the fuel temperature is above or below the control temperature. The control module 72 also includes control logic for monitoring the aircraft altitude to determine the appropriate control temperature for the fuel 40. As explained above, the LFL temperature of the fuel 40 is based on the fuel tank ullage pressure, and the aircraft altitude is indicative of the fuel tank ullage pressure. In the exemplary embodiment as shown in FIG. 2, the control module 72 is in signal communication with the compressor 80, and activates the phase change cooling system 92 by engaging the compressor 80 based on the fuel temperature and the aircraft altitude. However, those skilled in the art will readily appreciate that if the cooling system is a liquid cooling system or an air cycle cooling system, then the control module 72 may be in communication with other components of the center wing tank cooling system 60 that control the flow of cooling fluid.

In the event the fuel temperature is above the control temperature, then the control module 72 includes control logic for sending an activation signal for activating the phase change cooling system 92. Specifically, in the embodiment as shown in FIG. 2, the compressor 80 is engageable by the activation signal. Once the compressor 80 is engaged, the center wing tank cooling system 60 is operable to provide cooling to the lowermost surface 50 of the center wing tank 24. Specifically, if the phase change cooling system 92 is activated and the compressor 80 is engaged, the refrigerant 94 may undergo phase transitions in order to provide cooling to the lowermost surface 50 of the center wing tank 24.

The control module 72 continues to keep the phase change cooling system 92 activated (i.e., the compressor 80 remains engaged) until the fuel 40 located within the center wing tank 24 has been cooled to a lower limit temperature. The lower limit temperature may be a predetermined amount below the control temperature of the fuel. For example, in one embodiment, the lower limit temperature may range from about 0° C. below the control temperature to about 5° C. below the control temperature, however it is to be understood that these ranges are merely exemplary in nature and may be modified depending on system constraints. In one approach, the lower limit temperature of the fuel 40 may be set or determined such that any liquid water located within the center wing tank 24 may not freeze.

The lower limit temperature may be used to ensure that the center wing tank cooling system 60 does not continue to provide cooling to the center wing tank 24 if the lowermost surface 50 has already been cooled sufficiently. Thus, once the temperature sensor 140 indicates that the fuel 40 is at or below the lower limit temperature, the control module 72 may send a deactivation signal to deactivate the phase change cooling system 92. Specifically, in the non-limiting embodiment as shown in FIG. 2, the deactivation signal may be used to disengage the compressor 80. Once the phase change cooling system 92 is deactivated, the center wing tank cooling system 60 is no longer operable to provide cooling to the lowermost surface 50 of the center wing tank 24.

In one exemplary embodiment, the control module 72 may further include forward thinking logic that determines a specific turn-on time as well as a turn-off time of the center wing tank cooling system 60. Specifically, the control module 72 may monitor the heating rate or thermal inertia of the fuel 40 by continuously monitoring the temperature sensor 140 over a specified period of time. The control module 72 may also monitor a fuel level of the fuel 40 within the center wing tank 24 as well by monitoring a liquid level sensor (not illustrated). The control module 72 may then determine the specific turn-on time of the center wing tank cooling system 60 based on the thermal inertia as well as the fuel level of the fuel 40. Additionally, the control module 72 may also determine the specific turn-off time of the center wing tank cooling system 60 based on the thermal inertia as well as the fuel level of the fuel 40. Those skilled in the art will readily appreciate that the forward thinking logic of the control module 72 may set the turn-on and the turn-off times of the compressor 80 based on real time trends in the fuel level as well as the heating or cooling rate of the fuel 40, and may ultimately provide a more efficient approach for maintaining the temperature of the fuel 40 below the control temperature.

Figure 4:
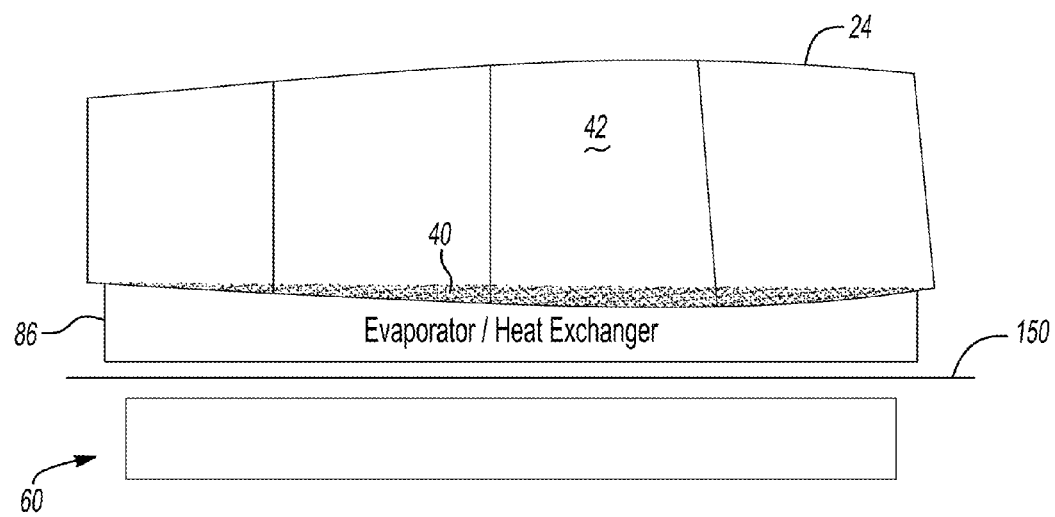
FIG. 4 is an alternative embodiment of the center wing tank cooling system shown in FIG. 2 further including a heat shield.
Figure 4:
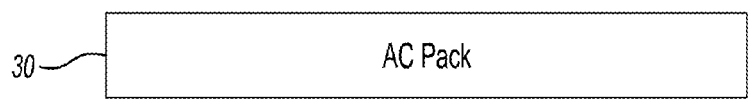

FIG. 4 is an alternative embodiment of the center wing tank cooling system 60. In particular, a heat shield 150 may be placed directly below the heat exchanger 86. The heat shield 150 may be used to deflect heat radiated by heat generating components of the center wing tank cooling system 60 such as, for example, the compressor 80 (shown in FIG. 2). Thus, the heat shield 150 may reduce temperature of the fuel 40 located within the center wing tank 24. As a result, the center wing tank cooling system 60 may be activated less often or for a shorter period of time. Moreover, the center wing tank cooling system 60 may also be smaller and more compact when compared to a cooling system where the heat shield 150 is not included.

Figure 5:
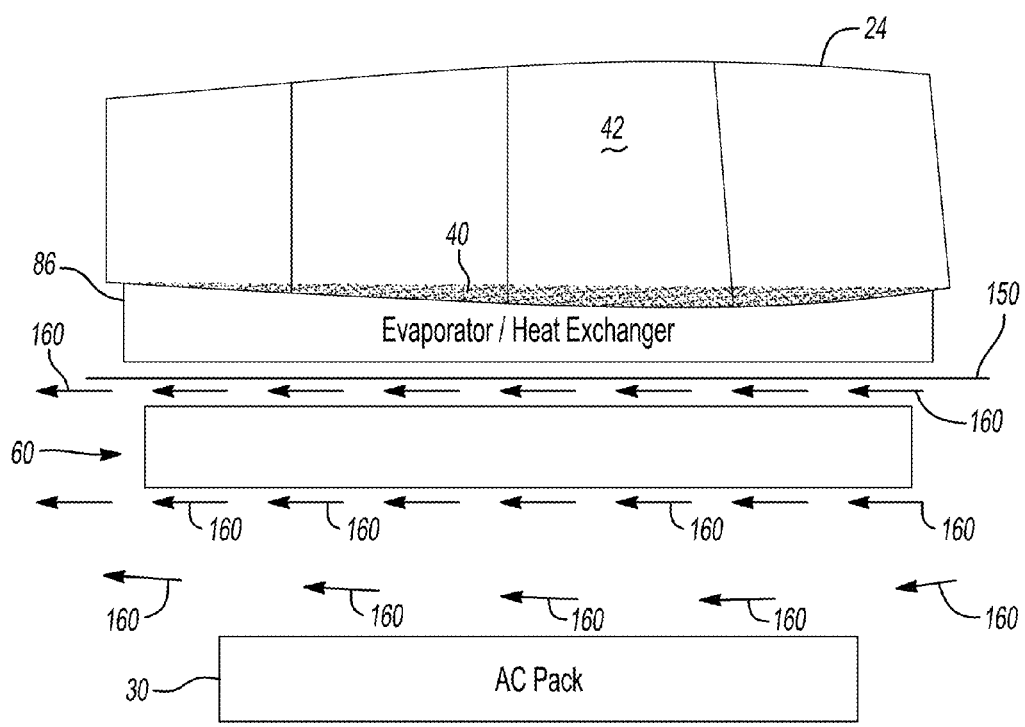
FIG. 5 is yet another embodiment of the center wing tank cooling system shown in FIG. 4, where cooling air may flow between the heat shield and the AC pack.

FIG. 5 is yet another embodiment of the center wing tank cooling system 60 including the heat shield 150. In the embodiment as shown in FIG. 5, cooling air 160 may be introduced around the heat generating components of the center wing tank cooling system 60 (i.e., the compressor 80 shown in FIG. 2) as well as the AC pack 30. The cooling air 160 may be used to dissipate heat radiated by the heat generating components of the center wing tank cooling system 60 as well as the AC pack 30. The cooling air 160 may either be ram air drawn from outside the aircraft 10 (FIG. 1), or air generated by a cooling fan (not illustrated in the figures). In the event the cooling air 160 is ram air, it is to be understood that the heat shield 150 may be omitted. The cooling air 160 may further reduce temperature of the fuel 40 located within the center wing tank 24. Thus, the center wing tank cooling system 60 may be activated less often or for a short period of time. Moreover, the center wing tank cooling system 60 may also be smaller and more compact when compared to a cooling system where the cooling air 160 is not used.

Referring generally to the figures, the disclosed center wing tank cooling system may provide a relatively simple approach for maintaining the temperature of fuel located within the center wing tank of the aircraft. Those skilled in the art will readily understand the importance of maintaining the temperature of the fuel within the center wing tank substantially below the LFL temperature. The disclosed center wing tank cooling system provides an automated, cost-effective approach for maintaining the temperature of the fuel within the center wing tank at or below the control temperature to ensure the fuel temperature is within a specific range.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. A system for cooling a fuel tank of an aircraft, wherein the fuel tank defines a surface, the system comprising:
   a temperature sensor for detecting a fuel temperature within the fuel tank, wherein the cooling system maintains the fuel temperature below a control temperature;
   a cooling system including a heat exchanger, wherein the heat exchanger is in thermal communication with a surface of the fuel tank and comprises a cooling loop configured to contact the surface of the fuel tank, wherein a cooling fluid flows through the cooling loop and draws heat from the surface of the fuel tank to provide cooling to fuel within the fuel tank, and wherein the cooling loop is not in contact with the fuel within the fuel tank; and
   a control module in signal communication with the temperature sensor and the cooling system, the control module including control logic for:
      monitoring the temperature sensor;
      determining the fuel temperature is above the control temperature; and
      generating an activation signal to activate the cooling system in response to determining the fuel temperature is above the control temperature.

2. The system as recited in claim 1, wherein the control temperature is based on a flash point of a fuel and a ullage pressure of the fuel tank.

3. The system as recited in claim 1, wherein the cooling loop is embedded within a lowermost surface of the fuel tank.

4. The system as recited in claim 1, wherein the cooling loop is arranged in a serpentine configuration along a lowermost surface of the fuel tank.

5. The system as recited in claim 1, wherein the control temperature is a predetermined margin below a lower flammability limit (LFL) temperature of a fuel.

6. The system as recited in claim 1, wherein the control temperature ranges from about 10° C. to about 32° C.

7. The system as recited in claim 1, further comprising a heat shield located directly below the heat exchanger.

8. The system as recited in claim 7, wherein cooling air is introduced around an AC pack and heat generating components of the cooling system.

9. The system as recited in claim 1, wherein the cooling system comprises a condenser, an expansion valve, and a refrigerant.

10. The system as recited in claim 9, wherein the cooling fluid is the refrigerant, and wherein the refrigerant flows through the heat exchanger to provide cooling to the fuel tank.

11. The system as recited in claim 1, wherein the control module includes control logic for generating a deactivation signal to deactivate the cooling system, wherein the control module generates the deactivation signal in response to the temperature sensor indicating the fuel temperature is at a lower limit temperature.

12. The system as recited in claim 11, wherein the lower limit temperature ranges from about 0° C. below the control temperature to about 5° C. below the control temperature.

13. A method of cooling a center wing tank of an aircraft, wherein the center wing tank defines a surface, comprising:
   detecting a fuel temperature within the center wing tank by a temperature sensor;
   monitoring the temperature sensor by a control module, wherein the control module is in signal communication with the temperature sensor;
   determining the fuel temperature is above a control temperature by the control module;
   generating an activation signal, by the control module, in response to determining the fuel temperature is above the control temperature, wherein the control module is in signal communication with a cooling system including a heat exchanger, and wherein the heat exchanger comprises a cooling loop configured to contact the surface of the center wing tank and the cooling loop is not in contact with fuel within the center wing tank;
   activating the cooling system in response to generating the activation signal; and
   flowing cooling fluid through the cooling loop in response to activating the cooling system, wherein the cooling fluid draws heat from the surface of the center wing tank to provide cooling to the fuel within the center wing tank.

14. The method of claim 13, comprising providing a heat shield located directly below the heat exchanger.

15. The method of claim 14, comprising providing cooling air around an AC pack and heat generating components of the cooling system.

16. The method of claim 13, comprising generating a deactivation signal by the control module in response to the temperature sensor indicating the fuel temperature is at a lower limit temperature, wherein the deactivation signal deactivates the cooling system.

17. The method of claim 13, wherein the cooling loop is embedded within a lowermost surface of the center wing tank.

\* \* \* \* \*